(12) United States Patent
Brattberg et al.

(10) Patent No.: US 12,077,947 B2
(45) Date of Patent: Sep. 3, 2024

(54) METHOD OF CONTROLLING WORKING MACHINE, CONTROL SYSTEM AND WORKING MACHINE

(71) Applicant: VOLVO CONSTRUCTION EQUIPMENT AB, Eskilstuna (SE)

(72) Inventors: Björn Brattberg, Torshälla (SE); Mikael Lindberg, Köping (SE); Lars Arkeborn, Eskilstuna (SE); Jan Dersjö, Eskilstuna (SE); Erik Ljungars, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 297 days.

(21) Appl. No.: 17/544,624

(22) Filed: Dec. 7, 2021

(65) Prior Publication Data

US 2022/0178112 A1 Jun. 9, 2022

(30) Foreign Application Priority Data

Dec. 8, 2020 (EP) ..................................... 20212366

(51) Int. Cl.
*E02F 9/26* (2006.01)
*B60W 30/09* (2012.01)
(Continued)

(52) U.S. Cl.
CPC ............. *E02F 9/261* (2013.01); *B60W 30/09* (2013.01); *B60W 30/18036* (2013.01);
(Continued)

(58) Field of Classification Search
CPC ... E02F 9/24; E02F 9/261; E02F 9/262; E02F 9/264; E02F 3/769; B60R 21/013;
(Continued)

(56) References Cited

U.S. PATENT DOCUMENTS

2020/0025923 A1 1/2020 Eichenholz
2020/0319346 A1 10/2020 Mei
(Continued)

FOREIGN PATENT DOCUMENTS

CN 105474635 A 4/2016
DE 102016109850 A1 11/2017
(Continued)

OTHER PUBLICATIONS

Extended European Search Report, European Patent Application No. 20212366.7, mailed Jun. 16, 2021, 7 pages.
(Continued)

*Primary Examiner* — Spencer D Patton
(74) *Attorney, Agent, or Firm* — Sage Patent Group (57) ABSTRACT

The invention relates to a method of controlling a working machine. The method includes monitoring a detection region behind the working machine by means of a rear detection device; and determining whether the working machine is traveling forward or in reverse. The method further includes disregarding an object in the detection region detected by the rear detection device when the working machine is traveling forward. The invention also relates to a control system for controlling a working machine having a rear detection device arranged to monitor a detection region behind the working machine. The invention also relates to a working machine.

25 Claims, 9 Drawing Sheets

(51) Int. Cl.
*B60W 30/18* (2012.01)
*E02F 9/24* (2006.01)

(52) U.S. Cl.
CPC .............. *E02F 9/24* (2013.01); *E02F 9/264* (2013.01); *B60W 2300/12* (2013.01)

(58) Field of Classification Search
CPC ........... B60R 21/0132; B60R 21/0134; B60W 30/09–0956; B60W 30/18036; B60W 2300/17; B60W 2420/52; B60W 2420/54; B60W 2420/60; B60W 2420/62; B60W 2520/06; B60W 2552/15
See application file for complete search history.

(56) References Cited

U.S. PATENT DOCUMENTS

2020/0385953 A1    12/2020  Sakuta et al.
2022/0389684 A1*   12/2022  Okabe ................... E02F 9/2083

FOREIGN PATENT DOCUMENTS

| FR | 3095392 A1 | 10/2020 |
| JP | 3219005 U | 11/2018 |
| WO | WO 2019/168122 A1 | 9/2019 |
| WO | 2020066228 A1 | 4/2020 |

OTHER PUBLICATIONS

Third Office Action for Chinese Patent Application No. 202111469113.2, mailed Feb. 1, 2024, 59 pages.

Office Action for European Patent Application No. 20212366.7, mailed Feb. 9, 2024, 4 pages.

* cited by examiner

METHOD OF CONTROLLING WORKING MACHINE, CONTROL SYSTEM AND WORKING MACHINE

CROSS REFERENCE TO RELATED APPLICATIONS

This application claims foreign priority to European Patent Application No. 20212366.7, filed on Dec. 8, 2020, the disclosures and content of which are incorporated by reference herein in their entirety.

TECHNICAL FIELD

The invention relates to a method of controlling a working machine, a control system for controlling a working machine, and a working machine. The invention is applicable to various working machines, such as wheel loaders, dumpers and excavators. Although the invention will be described mainly with respect to a wheel loader, the invention is not restricted to this particular vehicle.

BACKGROUND

A wheel loader is usually driven in a so-called short loading cycle. The short loading cycle may be V-shaped or Y-shaped. In the short loading cycle, the wheel loader may be driven forward and reverse in a first direction, change directions, and be driven forward and reverse in a second direction. Each movement segment may be approximately 10 meters. One or both movement segments may also comprise driving up on a pile. The reverse driving is often tricky for the driver. The driver may need to turn his/her head and the view may be obstructed by a hood of the wheel loader. Although there are mirrors, cameras and other system for assisting in rearward driving, it is very difficult to do this task for 8 hours per day and never miss a single obstacle. Reverse driving is also ergonomically bad for the driver when there is a need to turn around to look back.

JP 3219005 U discloses a construction vehicle capable of suppressing a collision with an obstacle during reverse travel.

SUMMARY

Although some prior art rear detection devices may be useful for detecting an obstacle behind a working machine, the prior art rear detection devices generate false positives during stockpiling when the working machine drives up on a pile with its front wheels and the rear detection device thereby faces down to the ground. Such prior art rear detection devices are therefore not useful for this type of operation with the working machine. A driver is therefore likely to be annoyed in case an alarm is issued frequently without a correct reason, or worse, if the working machine is automatically stopped frequently without a correct reason. Stockpiling is a normal operating mode of the working machine.

Countermeasures such as alarms and/or automatic braking should not be triggered every time the rear detection device faces down to the ground. It is however desired to utilize the rear detection devices for detecting true obstacles, for example when a human appears behind the working machine.

An object of the invention is to improve rear detection functionality in a working machine.

According to a first aspect, the object is achieved by a method of controlling a working machine according to claim 1. The method comprises monitoring a detection region behind the working machine by means of a rear detection device; and determining whether the working machine is traveling forward or in reverse. The method further comprises disregarding an object in the detection region detected by the rear detection device when the working machine is traveling forward.

When the working machine travels forward from a horizontal surface and onto an inclined surface, the rear detection device may detect the horizontal surface. Since the horizontal surface is not an obstacle that needs to be avoided in this situation, the method can reliably avoid a false positive detection of an object by the rear detection device. The method thereby improves rear detection functionality in the working machine.

With disregarding the object is meant that no countermeasure for avoiding collision with the object is triggered. Thus, no safety action is taken when the working machine is traveling forward and an object in the detection region is detected by the rear detection device. An object detected by the rear detection device in the detection region may however be used for comparison purposes, as described below.

The monitored detection region may have a width substantially corresponding to a width of the working machine and a length of approximately 1.5 m to 3 m. This detection region is often hard for the driver to see directly. The detection region may be two-dimensional or three-dimensional.

The method may be carried out with a working machine of any type as described herein. The determination of whether the working machine is traveling forward or in reverse may be made by means of a travel direction sensor. Since some working machines already comprise a rear detection device and a travel direction sensor, the method can be implemented with little or no hardware modification of the working machine. The travel direction sensor may determine a rotational direction of one or more wheels of the working machine.

According to one embodiment, the method further comprises traveling with the working machine in reverse towards or onto a base surface from an inclined surface, inclined relative to the base surface; detecting the base surface by means of the rear detection device when traveling in reverse towards or onto the base surface; and disregarding the detection of the base surface when traveling in reverse towards or onto the base surface.

When the working machine travels in reverse from the inclined surface and towards or onto the base surface, the rear detection device may detect the base surface. The base surface may however already have been detected when driving forward onto the inclined surface. Thus, the detected base surface when driving in reverse is not a new detection event. Since the base surface is not an obstacle that needs to be avoided, the method can reliably avoid a false positive detection of an object by the rear detection device also in this situation. The invention thus avoids false triggering of a previously detected base surface as an obstacle when driving the working machine in reverse down from the inclined surface. The inclined surface may be a pile surface of a pile.

The working machine and the rear detection device may be configured such that the rear detection device can detect a horizontal surface when the rear wheels of the working machine are positioned on the horizontal surface and a pitch of the working machine is 15 degrees to the horizontal surface, e.g. when its front wheels are positioned on the inclined surface.

According to one embodiment, the detection of the base surface by means of the rear detection device comprises determining that an object detected by the rear detection device is the base surface when a distance to the object measured by the rear detection device increases when traveling in reverse towards or onto the base surface. This feature is based on the insight that the distance to the base surface increases despite the working machine travels in reverse from the inclined surface towards or onto the base surface. The reason for this is that the pitch of the working machine may change. For example, when the working machine has its front wheels on the inclined surface and its rear wheels on a horizontal surface, the rear detection device may face down to the horizontal surface.

When the working machine travels in reverse from this position, the working machine becomes more and more aligned with the horizontal surface. This may cause the rear detection device to read an increased distance, despite traveling in reverse, as the working machine adopts the horizontal orientation on the horizontal surface. The working machine thus pitches until the working machine is horizontally oriented on the horizontal surface.

According to one embodiment, the method further comprises traveling with the working machine forward from the base surface and onto the inclined surface, such that the base surface is detected by the rear detection device as first detection information; traveling with the working machine in reverse from the inclined surface towards or onto the base surface, such that the base surface is detected by the rear detection device as second detection information; and determining whether the first detection information corresponds to the second detection information. In this way, the method can compare the first detection information of the base surface when driving up on the inclined surface with the second detection information when driving down from the inclined surface.

According to one embodiment, the method further comprises disregarding the second detection information upon determining that the second detection information corresponds to the first detection information. The first detection information can be memorized such that the detection of the base surface a second time when reversing down from the inclined surface does not cause triggering of automatic braking or other countermeasure. In case the second detection information when traveling in reverse does not correspond to the first detection information when traveling forward, it can be concluded that one or more additional objects (in addition to the base surface) has been detected by the rear detection device. In this case, a countermeasure may be needed. The method thereby provides a more reliable collision mitigation.

According to one embodiment, the method further comprises automatically triggering a countermeasure upon determining that the second detection information does not correspond to the first detection information. The method can thus reliably and correctly detect an obstacle and automatically act on that detection. By means of the countermeasure, a collision between the working machine and a detected object other than the base surface can be avoided, or an impact of such collision can be reduced. In this way, the method improves safety of the working machine.

According to one variant, the automatic triggering of a countermeasure is conditional upon a speed of the working machine being within a countermeasure speed range. The countermeasure speed range may be at least 2 km/h, such as at least 3 km/h. Alternatively, or in addition, the countermeasure speed range may be less than 20 km/h, such as less than 15 km/h.

According to one embodiment, the countermeasure comprises decelerating the working machine. Alternatively, or in addition, the countermeasure may comprise issuing an audible or visual alarm. In each case, the countermeasure may be executed for a limited time period, such as 2 s to 3 s. An audible or visual alarm may be issued both interior and exterior of the working machine.

According to one embodiment, the countermeasure comprises determining whether a forward gear, a neutral gear or a reverse gear of the working machine is active; interrupting a torque transfer through a driveline of the working machine and braking the working machine when the reverse gear is active; and braking the working machine when the neutral gear or the forward gear is active. In case the reverse gear is active, the interruption of the torque transfer through the driveline may comprise switching to the neutral gear. In case the neutral gear or the forward gear is active, the torque transfer through the driveline may not be interrupted.

In each case, the braking of the working machine may comprise braking with 30% to 70%, such as 50%, of a maximum braking torque of the working machine. Alternatively, or in addition, the braking of the working machine may comprise braking with a braking torque such that the working machine stops within the detection region behind the working machine.

In order to determine whether the forward gear, the neutral gear or the reverse gear of the working machine is active, the working machine may comprise a gear direction sensor. The gear direction sensor may be distinct from the travel direction sensor. That is, the working machine may travel in reverse with the forward gear (for example when rolling backwards down from a pile), and vice versa.

According to one embodiment, the method further comprises determining a blocking zone associated with a position of the working machine when detecting an object in the detection region by the rear detection device when the working machine is traveling forward. The working machine may comprise a positioning device for determining the blocking zone. Examples of such positioning device are a GPS (global positioning system) device and an odometer. An odometer has proven to function in this regard, since many work cycles associated with a pile involve substantially straight travel forward and in reverse. However, an odometer in combination with one or more steering angle sensors of the working machine may be used as the positioning device.

The method may further comprise communicating the blocking zone to a central system, e.g. the cloud. In this way, other working machines can be notified of one or more blocking zones at a worksite. A map containing such blocking zones can thereby be provided.

According to one example, the determination of the blocking zone is conditional upon that a distance to the detected object is larger than a threshold distance. That is, the blocking zone may be set only when the distance between the working machine and the position where the object was detected increases above the threshold distance.

According to one embodiment, the detection of the base surface by means of the rear detection device comprises determining that an object detected by the rear detection device is the base surface when the working machine is within the blocking zone. The determination of whether the working machine is within the blocking zone may be made by means of the positioning device. The blocking zone is a zone in which automatic triggering of a countermeasure can be suppressed. In case the countermeasure comprises a braking of the working machine, the blocking zone may thus be referred to as a brake blocking zone.

According to one embodiment, the inclined surface is inclined 10 degrees to 45 degrees, such as 25 degrees to 35 degrees, relative to the base surface. The inclined surface may be inclined at least 15 degrees relative to the base surface.

According to one embodiment, the base surface is substantially horizontal, or horizontal. However, the base surface may alternatively be inclined relative to horizontal.

According to one embodiment, the rear detection device comprises a distance sensor device or a camera device. The distance sensor device may be a sensor configured to emit and detect reflection of electromagnetic waves. The distance sensor device may for example be a radar, a lidar, an infrared sensor or an ultrasonic sensor. One example of a suitable radar is a continuous-wave frequency-modulated (CWFM) radar. The camera device may be a single camera or a stereo camera.

According to one embodiment, the working machine is a loader.

The invention also relates to a control system for controlling a working machine having a rear detection device arranged to monitor a detection region behind the working machine. The control system comprises at least one data processing device and at least one memory having a computer program stored thereon. The computer program comprises program code which, when executed by the at least one data processing device, causes the at least one data processing device to perform the steps of receiving rear detection information from the rear detection device; and receiving direction information indicative of whether the working machine is traveling forward or in reverse. The computer program comprises program code which, when executed by the at least one data processing device, causes the at least one data processing device to perform the step of disregarding rear detection information indicative of an object in the detection region when the working machine is traveling forward. The computer program may further comprise program code which, when executed by the at least one data processing device, causes the at least one data processing device to perform, or command performance of, any step as described herein.

According to one embodiment, the computer program comprises program code which, when executed by the at least one data processing device, causes the at least one data processing device to perform the steps of determining whether the direction information is indicative of the working machine is traveling in reverse; determining whether the rear detection information is indicative of a base surface when the working machine is traveling in reverse towards or onto the base surface from an inclined surface, inclined relative to the base surface; and disregarding the rear detection information indicative of the base surface when traveling in reverse towards or onto the base surface.

According to one embodiment, the computer program comprises program code which, when executed by the at least one data processing device, causes the at least one data processing device to perform the steps of receiving distance information from the rear detection device indicative of a distance to an object in the detection region; and determining that the object is the base surface when the distance increases when traveling in reverse to towards or onto the base surface.

According to one embodiment, the computer program comprises program code which, when executed by the at least one data processing device, causes the at least one data processing device to perform the steps of receiving rear detection information indicative of the base surface as first detection information when traveling forward from the base surface and onto the inclined surface; receiving rear detection information indicative of the base surface as second detection information when traveling in reverse from the inclined surface towards or onto the base surface; and determining whether the first detection information corresponds to the second detection information.

According to one embodiment, the computer program comprises program code which, when executed by the at least one data processing device, causes the at least one data processing device to perform the step of disregarding the second detection information upon determining that the second detection information corresponds to the first detection information.

According to one embodiment, the computer program comprises program code which, when executed by the at least one data processing device, causes the at least one data processing device to perform the step of automatically triggering a countermeasure upon determining that the second detection information does not correspond to the first detection information.

According to one embodiment, the countermeasure comprises commanding deceleration of the working machine.

According to one embodiment, the computer program comprises program code which, when executed by the at least one data processing device, causes the at least one data processing device to perform the steps of receiving gear information indicative of whether a forward gear, a neutral gear or a reverse gear of the working machine is active; commanding interruption of a torque transfer through a driveline of the working machine and commanding braking of the working machine when the reverse gear is active; and commanding braking of the working machine when the neutral gear or the forward gear is active.

According to one embodiment, the computer program comprises program code which, when executed by the at least one data processing device, causes the at least one data processing device to perform the step of determining a blocking zone associated with a position of the working machine when detecting an object in the detection region by the rear detection device when the working machine is traveling forward.

According to one embodiment, the computer program comprises program code which, when executed by the at least one data processing device, causes the at least one data processing device to perform the step of determining that an object detected by the rear detection device is the base surface when the working machine is within the blocking zone.

According to one embodiment, the inclined surface is inclined 10 degrees to 45 degrees relative to the base surface.

According to one embodiment, the base surface is substantially horizontal.

The invention also relates to a working machine. The working machine comprises a control system according to the invention. The working machine may be of any type as described herein.

According to one embodiment, the working machine further comprises the rear detection device. The rear detection device may for example be positioned at a height between 0.3 m to 1.5 m.

According to one embodiment, the working machine is a loader, such as a wheel loader. The working machine alternatively be a dumper or an excavator.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the following, a method of controlling a working machine, a control system for controlling a working machine, and a working machine, will be described. The same reference numerals will be used to denote the same or similar structural features.

Figure 1:
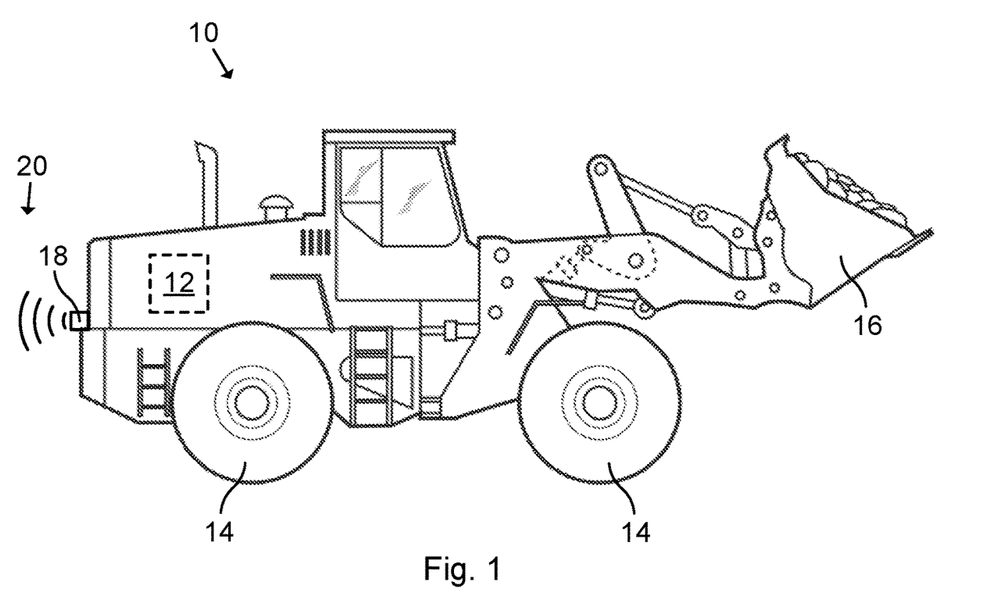
FIG. 1 schematically illustrates a side view of a wheel loader.

FIG. 1 schematically illustrates a side view of a wheel loader 10. The wheel loader 10 is one example of a working machine according to the invention. The wheel loader 10 comprises a control system 12. The wheel loader 10 of this example comprises four wheels 14 and a bucket 16.

The wheel loader 10 further comprises a rear detection device 18. By means of the rear detection device 18, a detection region 20 behind the wheel loader 10 can be monitored. The rear detection device 18 may for example be positioned at a height of 0.3 m to 1.5 m above the ground. The detection region 20 may for example extend 2.5 m behind the wheel loader 10.

Figure 2:
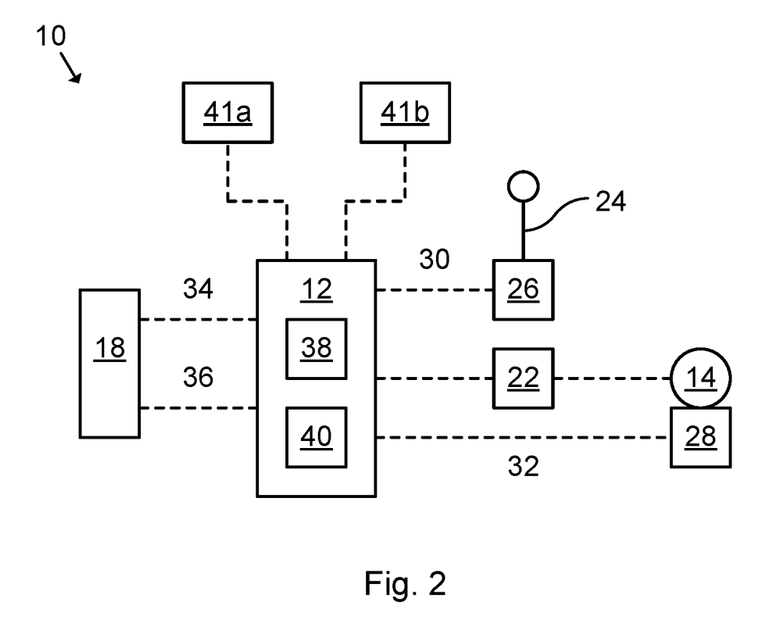
FIG. 2 schematically illustrates a block diagram of the wheel loader.

FIG. 2 schematically illustrates a block diagram of the wheel loader 10. In addition to the control system 12, the rear detection device 18 and the wheels 14, the wheel loader 10 of this example further comprises a driveline 22, a gearshift lever 24, a gear direction sensor 26 and a travel direction sensor 28.

The gearshift lever 24 of this example can be manually put in a forward gear, a neutral gear or a reverse gear. The gear direction sensor 26 is arranged to detect whether the forward gear, the neutral gear or the reverse gear is currently applied. The gear direction sensor 26 is further configured to send gear information 30 to the control system 12 containing information regarding the position of the gearshift lever 24.

The travel direction sensor 28 is arranged to determine whether the wheel loader 10 is traveling forward or in reverse. To this end, the travel direction sensor 28 of this specific example monitors a rotational direction of at least one of the wheels 14. The travel direction sensor 28 is further configured to send direction information 32 to the control system 12 containing information regarding the travel direction of the wheel loader 10.

The rear detection device 18 is here a distance sensor device that can measure a distance to an object behind the wheel loader 10. The rear detection device 18 is configured to obtain rear detection information 34 and distance information 36 from the detection region 20 and to send the rear detection information 34 and the distance information 36 to the control system 12. Although the rear detection information 34 and the distance information 36 are illustrated as two signals, the distance information 36 may alternatively be extracted from the rear detection information 34.

The rear detection device 18 of this specific example is a continuous-wave frequency-modulated (CWFM) radar, but a wide range of alternative rear detection devices may be used instead. The rear detection device 18 may also comprise a passive infrared (PIR) sensor. A PIR sensor can detect heated objects in the detection region 20 behind the wheel loader 10.

In case the rear detection device 18 is a camera, an object in the detection region 20 behind the wheel loader 10 can be detected by means of video looming or deep learning. Video looming may comprise concluding that an object approaches when its size on an image increases. Video looming only requires a single camera. By means of deep learning, an algorithm can be trained to identify objects of interest, e.g. humans.

As a further example of a rear detection device 18, the rear detection device 18 comprises a stereo camera. A stereo camera is capable of capturing three-dimensional images.

The control system 12 comprises a data processing device 38 and a memory 40. The memory 40 has a computer program stored thereon. The computer program comprises program code which, when executed by the data processing device 38, causes the data processing device 38 to perform, or command performance of, various steps as described herein.

The wheel loader 10 of this example further comprises a GPS 41a and an odometer 41b. Each of the GPS 41a and the odometer 41b is in signal communication with the control system 12. The GPS 41a and the odometer 41b are examples of a positioning device according to the invention.

Figure 3:
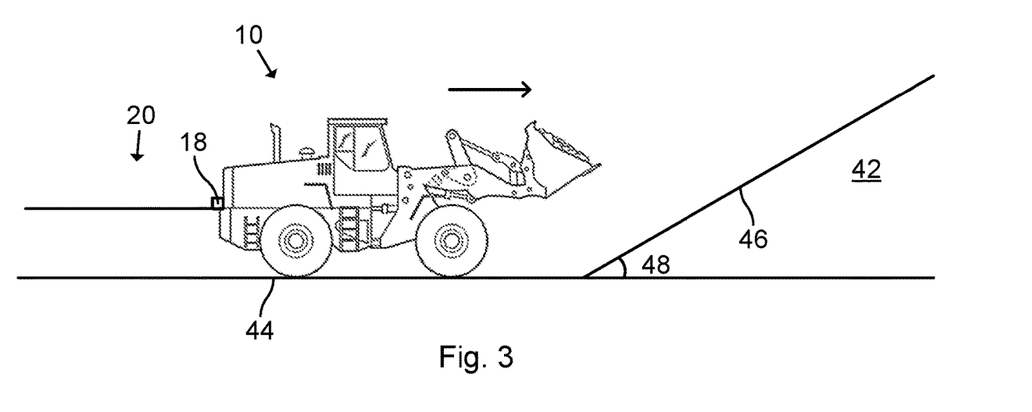
FIG. 3 schematically illustrates the wheel loader and a pile when the wheel loader drives towards the pile.

FIG. 3 schematically illustrates the wheel loader 10 and a pile 42 when the wheel loader 10 drives towards the pile 42. The wheel loader 10 drives on a horizontal surface 44 and the pile 42 comprises a pile surface 46. The horizontal surface 44 and the pile surface 46 are examples of a base surface and an inclined surface, respectively, according to the invention. In FIG. 3, an angle 48 between the pile surface 46 and the horizontal surface 44 is 30 degrees, which is a typical angle of piles of various materials. The rear detection device 18 monitors the detection region 20 behind the wheel loader 10.

Figure 4:
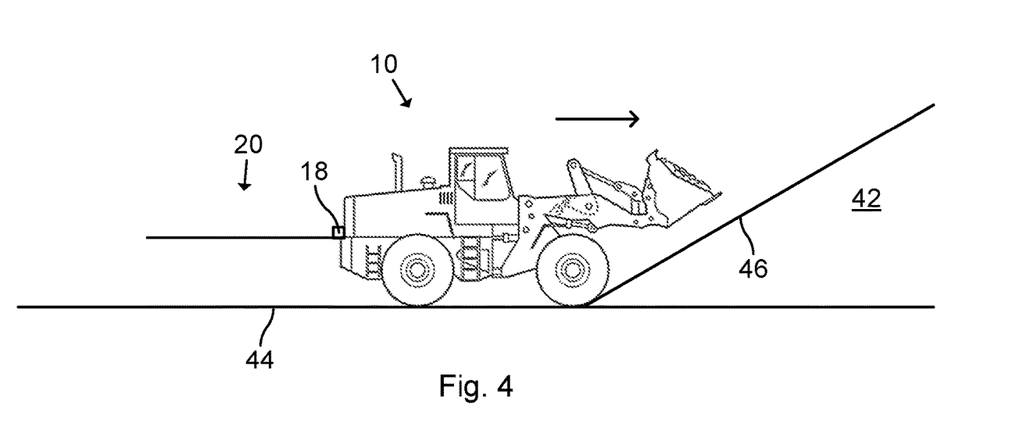
FIG. 4 schematically illustrates the wheel loader and the pile when the wheel loader has reached the pile.
Figure 5:
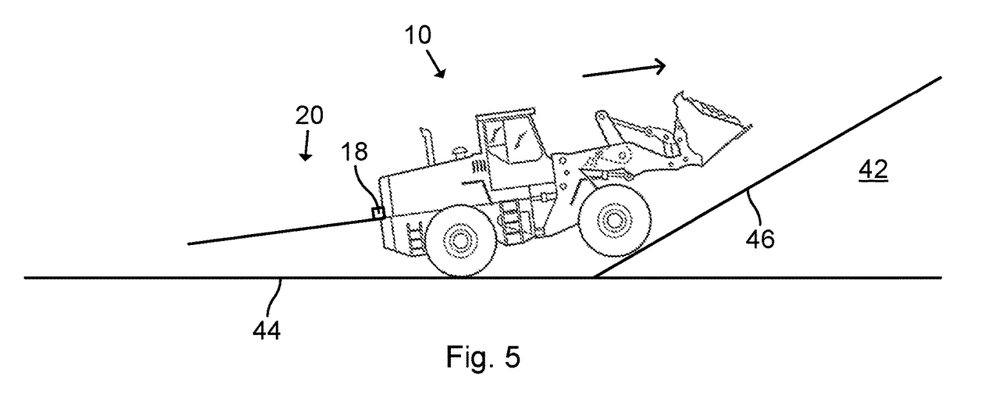
FIG. 5 schematically illustrates the wheel loader and the pile when the wheel loader drives up onto the pile.

FIG. 4 schematically illustrates the wheel loader 10 and the pile 42 when the wheel loader 10 has reached the pile 42, and FIG. 5 schematically illustrates the wheel loader 10 and the pile 42 when the wheel loader 10 drives up onto the pile 42. In FIG. 5, the front wheels are positioned on the pile surface 46 and the rear wheels are positioned on the horizontal surface 44. The wheel loader 10 therefore pitches when moving from the FIG. 4 position to the FIG. 5 position relative to the pile 42.

Figure 6:
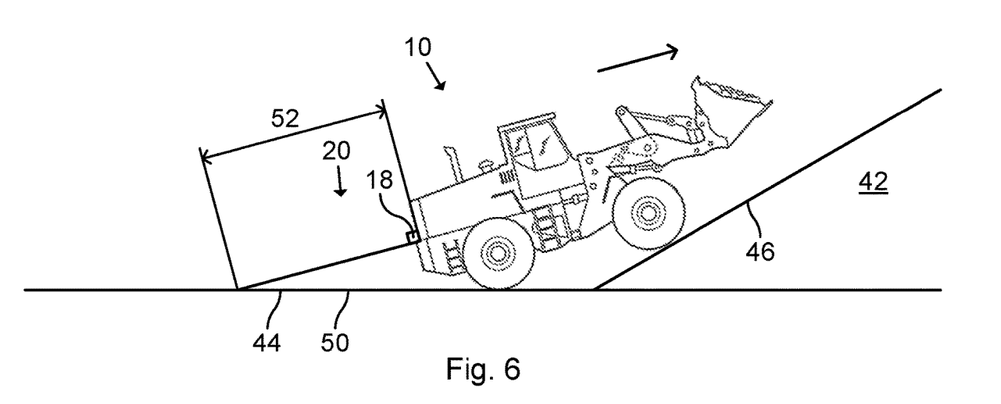
FIG. 6 schematically illustrates the wheel loader and the pile when the wheel loader drives further up onto the pile.

FIG. 6 schematically illustrates the wheel loader 10 and the pile 42 when the wheel loader 10 drives further up onto the pile 42. In FIG. 6, the wheel loader 10 has pitched further such that the rear detection device 18 detects the horizontal surface 44 as an object 50. FIG. 6 shows also shows a distance 52 from the wheel loader 10 to the horizontal surface 44 as measured by the rear detection device 18. In FIG. 6, the wheel loader 10 is pitched 15 degrees relative to the horizontal surface 44.

In the position of the wheel loader 10 in FIG. 6 when the wheel loader 10 travels forward up on the pile 42, the horizontal surface 44 detected by the rear detection device 18 is not an obstacle that should cause any countermeasure. In order to avoid this from happening, the invention disregards such detections when the wheel loader 10 travels forward. The invention comprises a determination of whether the wheel loader 10 travels forward or in reverse, e.g. based on the direction information 32 sent from the travel direction sensor 28 to the control system 12. Upon determining that the wheel loader 10 travels forward, the detection event triggered by the detection of the horizontal surface 44 by the rear detection device 18 is ignored. In this way, false positives caused by the horizontal surface 44 can be avoided when driving forward up the pile 42.

The detection of the horizontal surface 44 can be made based on either of the rear detection information 34 or the distance information 36. In any case, the detection of the horizontal surface 44 by the rear detection device 18 is stored as first detection information, e.g. in the memory 40.

When the object 50 is detected by the rear detection device 18 and the wheel loader 10 travels forward, the position of the working machine 10 may be stored in order to utilize a concept of blocking zones, as described below. The position of the wheel loader 10 may be determined by means of the GPS 41a and/or the odometer 41b, and may be stored in the memory 40. In any case, a distance travelled in relation to this position may be monitored. The odometer 41b may for example be reset when the object 50 is detected in the detection region 20 by the rear detection device 18 when the wheel loader 10 is traveling forward.

Figure 7:
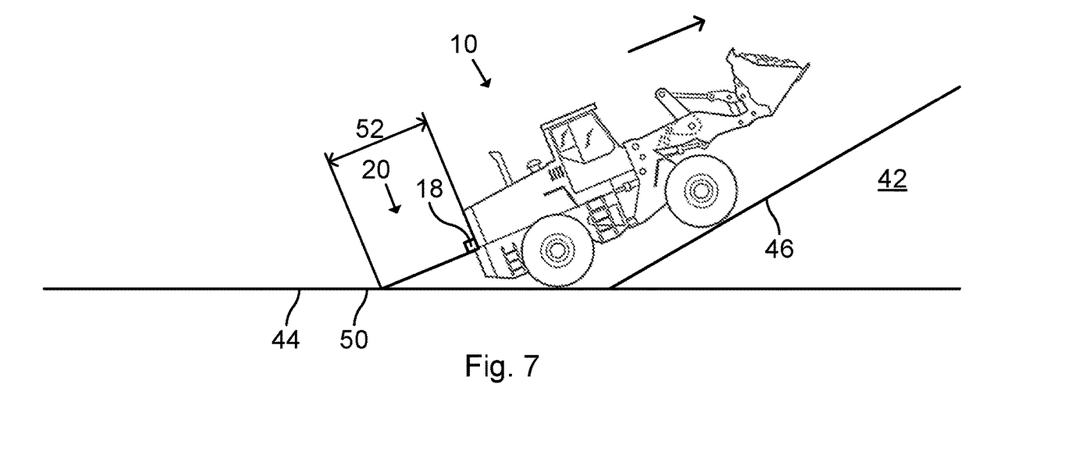
FIG. 7 schematically illustrates the wheel loader and the pile when the wheel loader drives further up onto the pile.
Figure 8:
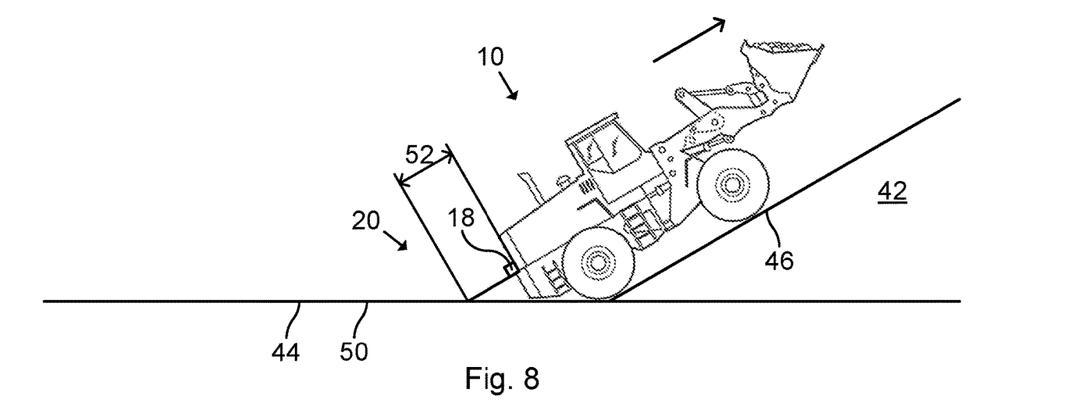
FIG. 8 schematically illustrates the wheel loader and the pile when the wheel loader drives further up onto the pile.

FIG. 7 schematically illustrates the wheel loader 10 and the pile 42 when the wheel loader 10 drives further up onto the pile 42, and FIG. 8 schematically illustrates the wheel loader 10 and the pile 42 when the wheel loader 10 drives even further up onto the pile 42. In the position of the wheel loader 10 in FIG. 8, all wheels are in contact with the pile surface 46. Thus, the wheel loader 10 is inclined 30 degrees in FIG. 8. The rear wheels are positioned at a junction between the horizontal surface 44 and the pile surface 46.

As illustrated in FIGS. 6, 7 and 8, the distance 52 as measured by the rear detection device 18 becomes shorter and shorter, despite the wheel loader 10 drives away from the horizontal surface 44. This is due to the successive pitching (counterclockwise in FIGS. 6 to 8) of the wheel loader 10 from 15 degrees pitch in FIG. 6 to the 30 degrees pitch in FIG. 8.

Figure 9:
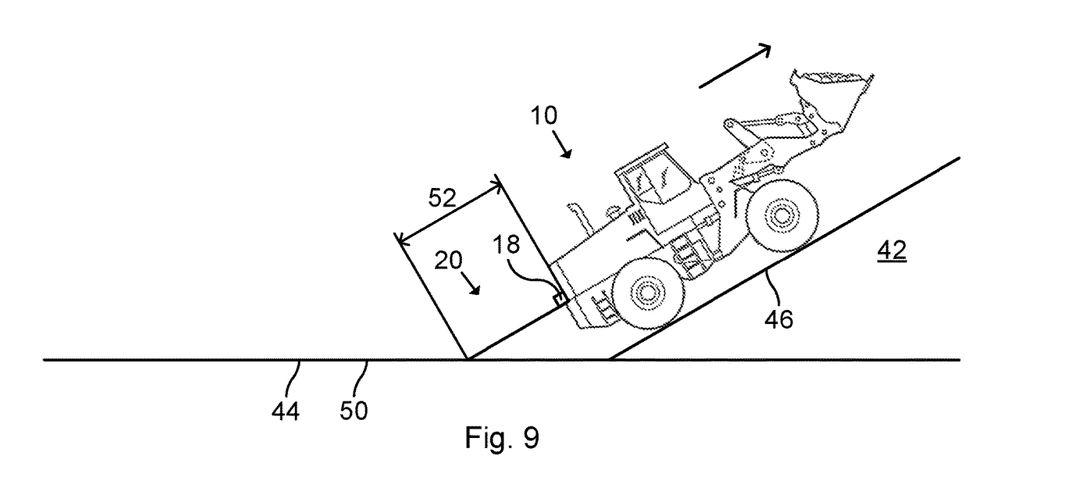
FIG. 9 schematically illustrates the wheel loader and the pile when the wheel loader drives further up onto the pile.

FIG. 9 schematically illustrates the wheel loader 10 and the pile 42 when the wheel loader 10 drives further up onto the pile 42. When the wheel loader 10 drives forward from the FIG. 8 position to the FIG. 9 position, the distance 52, as measured by the rear detection device 18 increases. Also in each of the positions of the wheel loader 10 according to FIGS. 7, 8 and 9, the rear detection information 34 of the horizontal surface 44 as detected by the rear detection device 18 is stored as first detection information.

Figure 10:
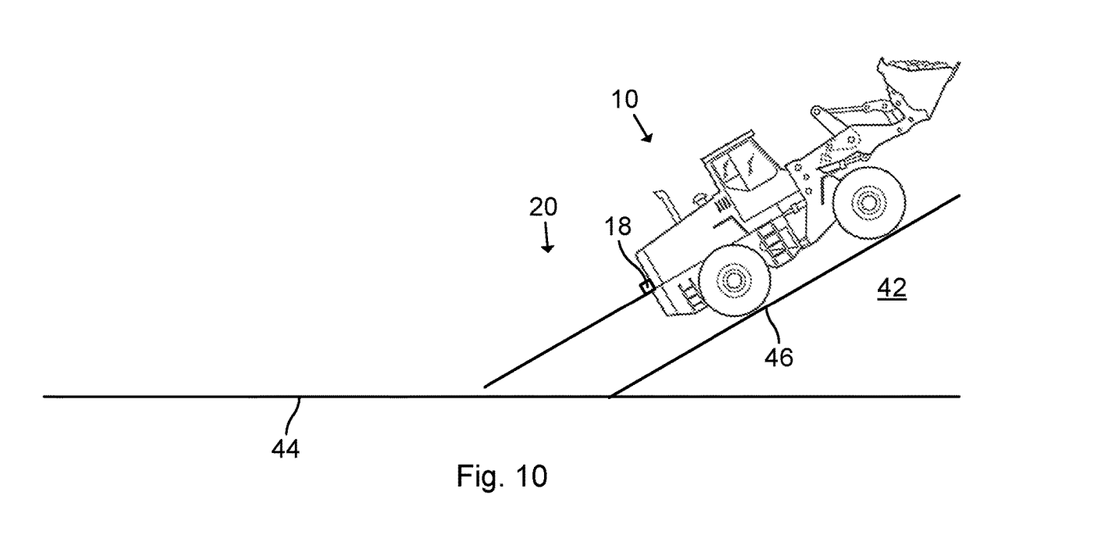
FIG. 10 schematically illustrates the wheel loader and the pile when the wheel loader has stopped on the pile.

FIG. 10 schematically illustrates the wheel loader 10 and the pile 42 when the wheel loader 10 has stopped on the pile 42. When the wheel loader 10 drives forward from the FIG. 9 position to the FIG. 10 position, the distance 52, as measured by the rear detection device 18 increases further. When the wheel loader 10 has reached the position on the pile 42 according to FIG. 10, the wheel loader 10 dumps its load onto the pile 42 by means of the bucket 16.

When the wheel loader 10 has travelled a distance from the FIG. 6 position that is larger than a threshold distance, a blocking zone may be associated with the position of the wheel loader 10 in FIG. 6 (where the object 50 was first detected by the rear detection device 18). Otherwise, the blocking zone may not be set. The blocking zone may be represented by one or several positions where the object 50 has been detected by the rear detection device 18 when the wheel loader 10 travels forward. Alternatively, or in addition, the blocking zone may be represented by a distance from one or more of such positions. The threshold distance may for example be 10 meters.

The blocking zone may be wirelessly communicated to a central system. A map containing a plurality of such blocking zones can then be created and shared between working machines.

Figure 11:
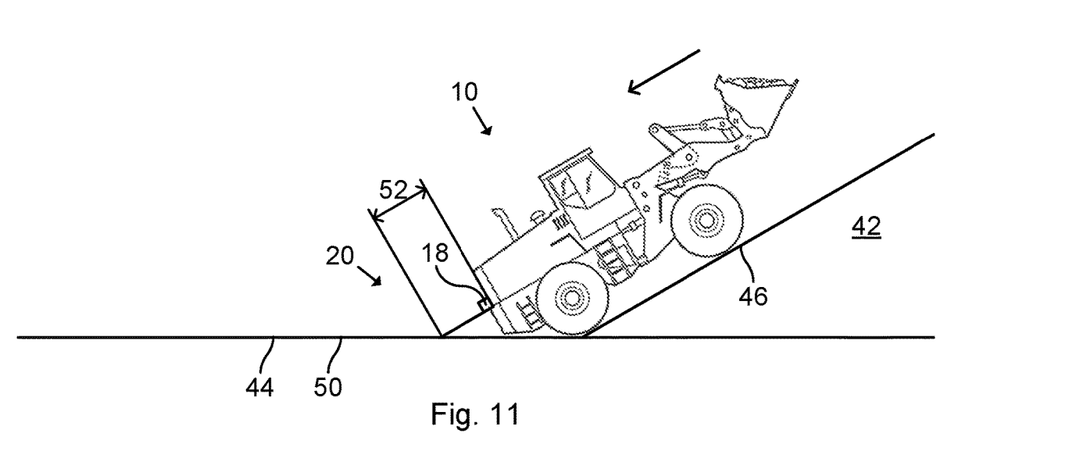
FIG. 11 schematically illustrates the wheel loader and the pile when the wheel loader travels in reverse from the pile and there is no obstacle behind the wheel loader.

FIG. 11 schematically illustrates the wheel loader 10 and the pile 42 when the wheel loader 10 travels in reverse from the pile 42 and there is no obstacle behind the wheel loader 10. In FIG. 11, the rear wheels of the wheel loader 10 start to come in contact with the horizontal surface 44. As shown in FIG. 11, the rear detection device 18 detects the horizontal surface 44. However, the horizontal surface 44 is not a true object that needs triggering of a countermeasure. When the wheel loader 10 backs down, there is a need to not trigger the automatic brake all the time.

Since the wheel loader 10 now travels in reverse, the rear detection information 34 of the horizontal surface 44 as detected by the rear detection device 18 is stored as second detection information. From a comparison between FIGS. 8 and 11, it is clear that the second detection information read by the rear detection device 18 in the position of the wheel loader 10 in FIG. 11 corresponds to the first detection information read by the rear detection device 18 in the position of the wheel loader 10 in FIG. 8. Thus, this event is already triggered. By comparing the first detection information when the wheel loader 10 travels forward up onto the pile 42 with the second detection information when the wheel loader 10 travels in reverse down from the pile 42, it can be concluded that the first detection information and the second detection information represent the same event. Based on this conclusion, it can be determined that the detected object 50 is the horizontal surface 44, and not an obstacle that needs triggering of a countermeasure. The second detection information is therefore disregarded. The first detection information and the second detection information do however not need to be obtained at the exact same position relative to the pile 42.

In case a blocking zone has been associated with the FIG. 6 position of the wheel loader 10, no countermeasure is triggered when the object 50 is detected by the rear detection device 18, the wheel loader 10 is traveling in reverse and the wheel loader 10 is within the blocking zone. For example, let's say the odometer 41b is reset in response to the first detection of the object 50 in the FIG. 6 position. When driving in reverse, the counting by the odometer 41b will decrease. If the wheel loader 10 comes within a threshold blocking distance from the position where the odometer 41b was reset, and the object 50 is detected by the rear detection device 18, it can be determined that the object 50 is the horizontal surface 14 and that no countermeasure should be triggered. The threshold blocking distance may for example be 10 meters.

Figure 12:
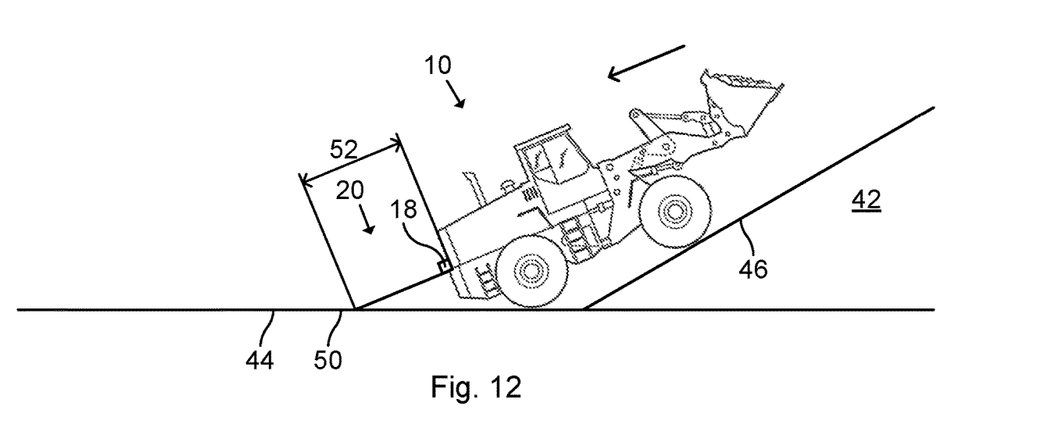
FIG. 12 schematically illustrates the wheel loader and the pile when the wheel loader travels further in reverse from the pile and there is no obstacle behind the wheel loader.

FIG. 12 schematically illustrates the wheel loader 10 and the pile 42 when the wheel loader 10 travels further in reverse from the pile 42. As illustrated in FIGS. 11 and 12, the distance 52 as measured by the rear detection device 18 becomes larger and larger, despite the wheel loader 10 drives towards the horizontal surface 44. This is due to the successive pitching (clockwise in FIGS. 11 and 12) of the wheel loader 10 when traveling in reverse down from the pile 42. The invention exploits this phenomenon by determining that the object 50 as detected by the rear detection device 18 when the distance 52 increases, despite the wheel loader 10 travels in reverse, is the horizontal surface 44.

A determination that the object 50 detected by the rear detection device 18 is the horizontal surface 44 may however be made in further alternative ways, for example by means of image processing of image data from a camera. Thus, the rear detection device 18 may be constituted by a camera and the rear detection information 34 may be image data.

In any case, when the object 50 behind the wheel loader 10, as detected by the rear detection device 18 when driving in reverse down from the pile 42, is the horizontal surface 44, the invention disregards this detection. In this way, false positives generated by the horizontal surface 44 can be avoided also when driving down from the pile 42.

Figure 13:
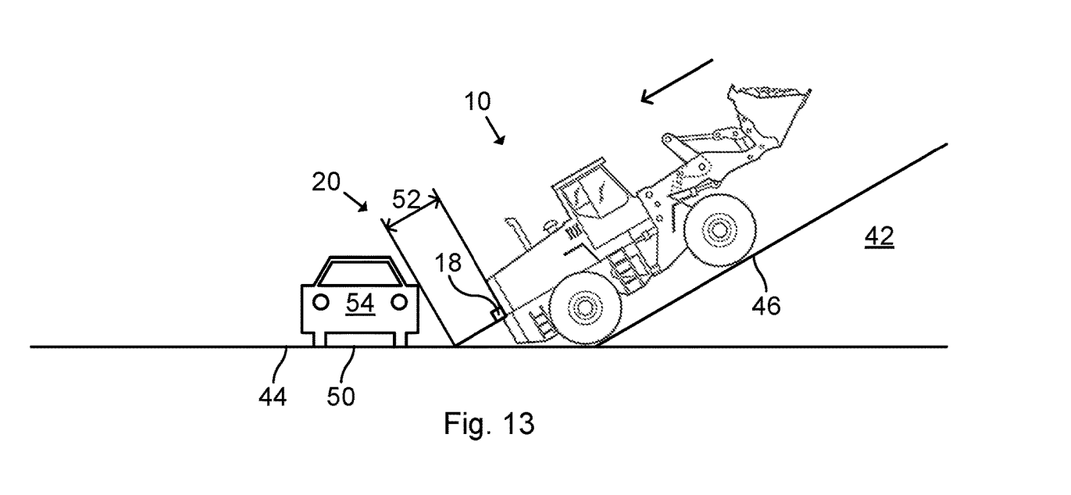
FIG. 13 schematically illustrates the wheel loader and the pile when the wheel loader travels in reverse from the pile and there is an obstacle behind the wheel loader.

FIG. 13 schematically illustrates the wheel loader 10 and the pile 42 when the wheel loader 10 travels in reverse from the pile 42. In FIG. 13, an object 54 has appeared behind the wheel loader 10. The object 54 is here exemplified as a car. In contrast to the horizontal surface 44, the object 54 is a true object. It is therefore desirable to trigger a countermeasure when the object 54 is detected, but not when the horizontal surface 44 is detected.

Since the wheel loader 10 now travels in reverse, the rear detection information 34 of the horizontal surface 44 as detected by the rear detection device 18 is stored as second detection information. From a comparison between FIGS. 8 and 13, it is clear that the second detection information read by the rear detection device 18 in the position of the wheel loader 10 in FIG. 13 does not correspond to the first detection information read by the rear detection device 18 in the position of the wheel loader 10 in FIG. 8 due to the appearance of the object 54. The invention therefore causes a countermeasure to be automatically triggered in this case.

Figure 14:
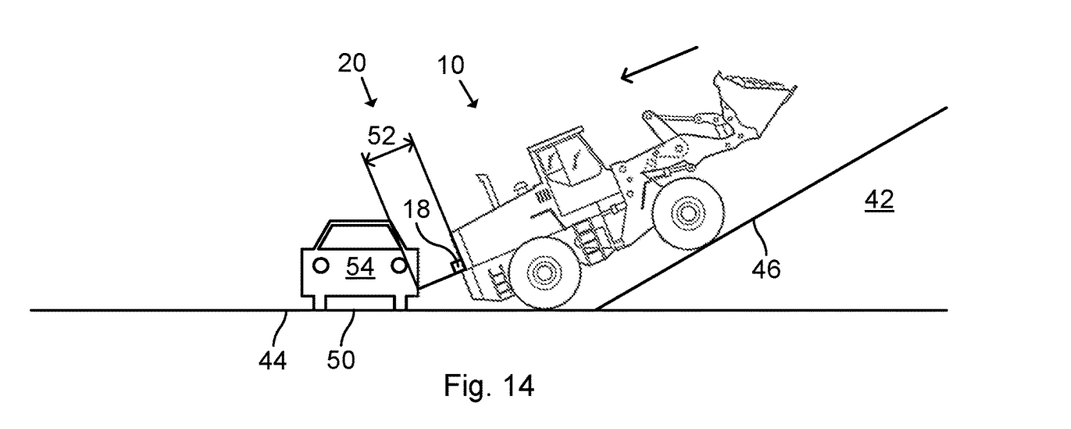
FIG. 14 schematically illustrates the wheel loader and the pile when the wheel loader travels further in reverse from the pile and there is an obstacle behind the wheel loader.

FIG. 14 schematically illustrates the wheel loader 10 and the pile 42 when the wheel loader 10 travels further in reverse from the pile 42 and there is an object 54 behind the wheel loader 10. In contrast to the movement of the wheel loader 10 from the FIG. 11 position to the FIG. 12 position, where the distance 52 as measured by the rear detection device 18 increases, the movement of the wheel loader 10 from the FIG. 13 position to the FIG. 14 position causes the rear detection device 18 to measure a decreasing distance 52. In response to this detection, a countermeasure is triggered automatically for avoiding collision between the wheel loader 10 and the object 54.

Figure 15:
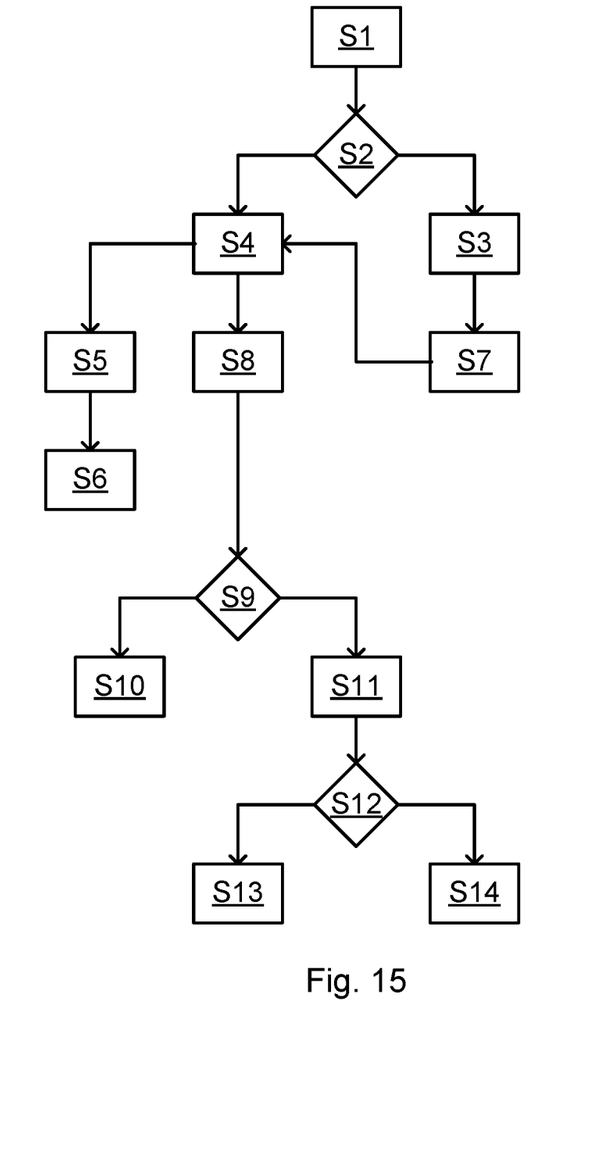
FIG. 15 is a flowchart outlining the general steps of the method according to the invention.

FIG. 15 is a flowchart outlining general steps of the method according to the invention. The method comprises a step S1 of monitoring the detection region 20 behind the wheel loader 10 by means of the rear detection device 18.

The method further comprises a step S2 of determining whether the wheel loader 10 is traveling forward or in reverse. In case the wheel loader 10 travels forward, the method proceeds to a step S3. In case the wheel loader 10 travels in reverse, the method proceeds to a step S4.

In step S3, the object 50 in the detection region 20 detected by the rear detection device 18 when the wheel loader 10 is traveling forward, is disregarded.

The method further comprises a step S7, following step S3, of detecting the horizontal surface 44 by the rear detection device 18 as first detection information when traveling with the wheel loader 10 forward from the horizontal surface 44 and onto the pile surface 46.

In step S4, the wheel loader 10 travels in reverse from the pile surface 46 towards or onto the horizontal surface 44. From step S4, the method may proceed to a step S5 or a step S8. Steps S5 and S8 may also be carried out in parallel.

In step S5, the horizontal surface 44 is detected by the rear detection device 18 when the wheel loader 10 travels in reverse towards or onto the horizontal surface 44.

The method further comprises a step S6, following step S5, of disregarding the detection of the horizontal surface 44 when traveling in reverse towards or onto the horizontal surface 44.

In step S8, the horizontal surface 44 is detected by the rear detection device 18 as second detection information.

The method further comprises a step S9, following step S8, of determining whether the first detection information corresponds to the second detection information.

If the first detection information corresponds to the second detection information, the method proceeds to a step S10. Otherwise, the method proceeds to a step S11.

In step S10, the second detection information is disregarded. That is, no countermeasure is triggered in step S10.

In step S11, a countermeasure is automatically triggered. The countermeasure is here exemplified as a deceleration of the wheel loader 10. The automatic triggering of a countermeasure may be conditional upon a speed of the wheel loader 10 being within a countermeasure speed range of 3 km/h to 15 km/h.

The method further comprises a step S12 of determining whether a forward gear, a neutral gear or a reverse gear of the wheel loader 10 is active, e.g. by means of the control system 12 based on the gear information 30. In case the reverse gear is active, the method proceeds to a step S13. In case the neutral gear or the forward gear is active, the method proceeds to a step S14. In step S13, the torque transfer through the driveline 22 is interrupted and the wheel loader 10 is braked. In step S14, the wheel loader 10 is braked, e.g. without interrupting the torque transfer through the driveline 22. In any case, the wheel loader 10 may be braked such that the wheel loader 10 comes to a full stop within the detection region 20.

The method may be tuned by adjusting one or more of the involved parameters. Examples of such parameters include the height of the rear detection device 18 above the ground, upper and/or lower limit(s) of the countermeasure speed range, size of the detection region 20 etc.

It is to be understood that the present invention is not limited to the embodiments described above and illustrated in the drawings; rather, the skilled person will recognize that many changes and modifications may be made within the scope of the appended claims.

The invention claimed is:

1. A method of controlling a working machine, the method comprising:
 monitoring a detection region behind the working machine by means of a rear detection device;
 determining whether the working machine is traveling forward or in reverse;
 disregarding an object in the detection region detected by the rear detection device when the working machine is traveling forward;
 traveling with the working machine in reverse towards or onto a base surface from an inclined surface, inclined relative to the base surface;
 detecting the base surface by means of the rear detection device when traveling in reverse towards or onto the base surface;
 disregarding the detection of the base surface when traveling in reverse towards or onto the base surface;
 traveling with the working machine forward from the base surface and onto the inclined surface, such that the base surface is detected by the rear detection device as first detection information;
 traveling with the working machine in reverse from the inclined surface towards or onto the base surface, such that the base surface is detected by the rear detection device as second detection information; and
 determining whether the first detection information corresponds to the second detection information.

2. The method according to claim 1, wherein the detection of the base surface by means of the rear detection device comprises:
 determining that an object detected by the rear detection device is the base surface when a distance to the object measured by the rear detection device increases when traveling in reverse towards or onto the base surface.

3. The method according to claim 1, further comprising:
 disregarding the second detection information upon determining that the second detection information corresponds to the first detection information.

4. The method according to claim 1, further comprising:
 automatically triggering a countermeasure upon determining that the second detection information does not correspond to the first detection information.

5. The method according to claim 4, wherein the countermeasure comprises decelerating the working machine.

6. The method according to claim 4, wherein the countermeasure comprises:
 determining whether a forward gear, a neutral gear or a reverse gear of the working machine is active;
 interrupting a torque transfer through a driveline of the working machine and braking the working machine when the reverse gear is active; and
 braking the working machine when the neutral gear or the forward gear is active.

7. The method according to claim 1, further comprising:
 determining a blocking zone associated with a position of the working machine when detecting an object in the detection region by the rear detection device when the working machine is traveling forward.

8. The method according to claim 7, wherein the detection of the base surface by means of the rear detection device comprises:
 determining that an object detected by the rear detection device is the base surface when the working machine is within the blocking zone.

9. The method according to claim 1, wherein the inclined surface is inclined 10 degrees to 45 degrees relative to the base surface.

10. The method according to claim 1 wherein the base surface is substantially horizontal.

11. The method according to claim 1, wherein the rear detection device comprises a distance sensor device or a camera device.

12. The method according to claim 1, wherein the working machine is a loader.

13. A control system for controlling a working machine having a rear detection device arranged to monitor a detection region behind the working machine, the control system comprising at least one data processing device and at least one memory having a computer program stored thereon, the computer program comprising program code which, when executed by the at least one data processing device, causes the at least one data processing device to perform the steps of:
 receiving rear detection information from the rear detection device;
 receiving direction information indicative of whether the working machine is traveling forward or in reverse;
 disregarding rear detection information indicative of an object in the detection region when the working machine is traveling forward;
 determining whether the direction information is indicative of the working machine traveling in reverse;
 determining whether the rear detection information is indicative of a base surface when the working machine is traveling in reverse towards or onto the base surface from an inclined surface, inclined relative to the base surface;
 disregarding the rear detection information indicative of the base surface when traveling in reverse towards or onto the base surface;
 receiving rear detection information indicative of the base surface as first detection information when traveling forward from the base surface and onto the inclined surface;
 receiving rear detection information indicative of the base surface as second detection information when traveling in reverse from the inclined surface towards or onto the base surface; and
 determining whether the first detection information corresponds to the second detection information.

14. The control system according to claim 13, wherein the computer program comprises program code which, when executed by the at least one data processing device, causes the at least one data processing device to perform the steps of:
 receiving distance information from the rear detection device indicative of a distance to an object in the detection region; and
 determining that the object is the base surface when the distance increases when traveling in reverse to towards or onto the base surface.

15. The control system according to claim 13, wherein the computer program comprises program code which, when executed by the at least one data processing device, causes the at least one data processing device to perform the step of:

disregarding the second detection information upon determining that the second detection information corresponds to the first detection information.

16. The control system according to claim 15, wherein the computer program comprises program code which, when executed by the at least one data processing device, causes the at least one data processing device to perform the step of:

automatically triggering a countermeasure upon determining that the second detection information does not correspond to the first detection information.

17. The control system according to claim 16, wherein the countermeasure comprises commanding deceleration of the working machine.

18. The control system according to claim 16, wherein the computer program comprises program code which, when executed by the at least one data processing device, causes the at least one data processing device to perform the steps of:

receiving gear information indicative of whether a forward gear, a neutral gear or a reverse gear of the working machine is active;

commanding interruption of a torque transfer through a driveline of the working machine and commanding braking of the working machine when the reverse gear is active; and commanding braking of the working machine when the neutral gear or the forward gear is active.

19. The control system according to claim 13, wherein the computer program comprises program code which, when executed by the at least one data processing device, causes the at least one data processing device to perform the step of:

determining a blocking zone associated with a position of the working machine when detecting an object in the detection region by the rear detection device when the working machine is traveling forward.

20. The control system according to claim 19, wherein the computer program comprises program code which, when executed by the at least one data processing device, causes the at least one data processing device to perform the step of:

determining that an object detected by the rear detection device is the base surface when the working machine is within the blocking zone.

21. The control system according to claim 13, wherein the inclined surface is inclined 10 degrees to 45 degrees relative to the base surface.

22. The control system according to claim 13, wherein the base surface is substantially horizontal.

23. A working machine comprising a control system according to claim 13.

24. The working machine according to claim 23, further comprising the rear detection device.

25. The working machine according to claim 23, wherein the working machine is a loader.

* * * * *